United States Patent [19]

Sakaue et al.

[11] Patent Number: 5,296,920
[45] Date of Patent: Mar. 22, 1994

[54] COLOR GRADATION CORRECTION METHOD AND APPARATUS

[75] Inventors: Shigeo Sakaue, Moriguchi; Susumu Maruno; Haruo Yamashita, both of Osaka; Yasuki Matsumoto, Hirakata; Hideshi Ishihara, Katano, all of Japan

[73] Assignee: Matsushita Electric Industrial, Co., Ltd., Osaka, Japan

[21] Appl. No.: 945,626

[22] Filed: Sep. 16, 1992

[30] Foreign Application Priority Data

Sep. 17, 1991 [JP] Japan .................. 3-236068

[51] Int. Cl.$^5$ ............................................. H04N 9/69
[52] U.S. Cl. ....................... 348/675; 358/521; 358/519
[58] Field of Search ............... 358/32, 164, 160, 21 R, 358/519-521; H04N 5/16, 9/69/5/202, 9/77

[56] References Cited

U.S. PATENT DOCUMENTS

| | | | |
|---|---|---|---|
| 4,086,615 | 4/1978 | Koubek | 358/34 |
| 4,668,979 | 5/1987 | Jüng | 358/520 X |
| 4,697,208 | 9/1987 | Eino | 358/44 |
| 4,812,903 | 3/1989 | Wagonsonner et al. | 358/521 |
| 4,831,434 | 5/1989 | Fuchsberger | 358/521 |
| 4,837,612 | 6/1989 | Miller | 358/28 |
| 4,841,360 | 6/1989 | Birgmeir | 358/521 |

FOREIGN PATENT DOCUMENTS

| | | | |
|---|---|---|---|
| 0430165 | 6/1991 | European Pat. Off. | |
| 2575884 | 7/1986 | France | |
| 63-67890 | 3/1988 | Japan | H04N 9/69 |
| 63-275285 | 11/1988 | Japan | H04N 9/69 |
| 1-41593 | 2/1989 | Japan | H04N 9/69 |
| 1-154694 | 6/1989 | Japan | H04N 9/69 |
| 2-140088 | 5/1990 | Japan | |
| 2-295394 | 12/1990 | Japan | |
| 3-6987 | 1/1991 | Japan | |
| 3-64192 | 3/1991 | Japan | |
| 3-73674 | 3/1991 | Japan | H04N 5/202 |
| 4-17486 | 1/1992 | Japan | H04N 9/69 |
| 2194706 | 3/1988 | United Kingdom | |

*Primary Examiner*—Mark R. Powell
*Attorney, Agent, or Firm*—Ratner & Prestia

[57] ABSTRACT

A gradation correction apparatus for processing R, G, and B input signals includes a luminance signal conversion device for obtaining the original luminance signal, which is before gamma conversion, from the input signals, a luminance gamma conversion device for gamma converting the original luminance signal to the desired gradation characteristics to obtain a gamma converted luminance signal, a correction coefficient calculation means for obtaining a ratio of the gamma converted luminance signal to the original luminance signal, a first RGB operation means for multiplying the ratio by each of the R, G, and B input signals for obtaining primary gradation-corrected R, G, and B signals; a color difference signal operation means for producing a difference between each of the R, G, and B input signals and the original luminance signal; a second RGB operation means for adding the gamma converted luminance signal to each of the difference for obtaining secondary gradation-corrected R, G, and B signals; and an RGB determination means for obtaining final gradation-corrected R, G, B signals based on the primary and secondary gradation-corrected R, G, and B signals.

12 Claims, 11 Drawing Sheets

| g | PAGE INFORMATION | | | | Y INFORMATION | | DATA | |
|---|---|---|---|---|---|---|---|---|
| | $A_{11}$ | $A_{10}$ | $A_9$ | $A_8$ | $A_7$ -------- $A_0$ | | $D_7$ ~ | $D_0$ |
| 0.6 | 0 | 0 | 0 | 0 | 0   0 ------ 0 | | | |
| | | | | ″ | 1   1 ------ 1 | | | |
| 0.65 | 0 | 0 | 0 | 1 | 0   0 ------ 0 | | | |
| | | | | ″ | 1   1 ------ 1 | | | |
| 0.7 | 0 | 0 | 1 | 0 | 0   0 ------ 0 | | | |
| | | | | ″ | 1   1 ------ 1 | | | |
| 0.75 | 0 | 0 | 1 | 1 | 0   0 ------ 0 | | | |
| | | | | ″ | 1   1 ------ 1 | | | |
| 0.8 | 0 | 1 | 0 | 0 | 0   0 ------ 0 | | | |
| | | | | ″ | 1   1 ------ 1 | | | |
| 0.85 | 0 | 1 | 0 | 1 | 0   0 ------ 0 | | | |
| | | | | ″ | 1   1 ------ 1 | | | |
| 0.9 | 0 | 1 | 1 | 0 | 0   0 ------ 0 | | | |
| | | | | ″ | 1   1 ------ 1 | | | |
| 0.95 | 0 | 1 | 1 | 1 | 0   0 ------ 0 | | | |
| | | | | ″ | 1   1 ------ 1 | | | |
| 1.0 | 1 | 0 | 0 | 0 | 0   0 ------ 0 | | | |
| | | | | ″ | 1   1 ------ 1 | | | |
| 1.05 | 1 | 0 | 0 | 1 | 0   0 ------ 0 | | | |
| | | | | ″ | 1   1 ------ 1 | | | |
| 1.1 | 1 | 0 | 1 | 0 | 0   0 ------ 0 | | | |
| | | | | ″ | 1   1 ------ 1 | | | |
| 1.15 | 1 | 0 | 1 | 1 | 0   0 ------ 0 | | | |
| | | | | ″ | 1   1 ------ 1 | | | |
| 1.2 | 1 | 1 | 0 | 0 | 0   0 ------ 0 | | | |
| | | | | ″ | 1   1 ------ 1 | | | |
| 1.25 | 1 | 1 | 0 | 1 | 0   0 ------ 0 | | | |
| | | | | ″ | 1   1 ------ 1 | | | |
| 1.3 | 1 | 1 | 1 | 0 | 0   0 ------ 0 | | | |
| | | | | ″ | 1   1 ------ 1 | | | |
| 1.35 | 1 | 1 | 1 | 1 | 0   0 ------ 0 | | | |
| | | | | ″ | 1   1 ------ 1 | | | |

BEFORE GAMMA CONVERSION (Y)

COLOR GRADATION CORRECTION METHOD AND APPARATUS

BACKGROUND OF THE INVENTION

1. Field of the Invention

The present invention relates to a gradation conversion method for video signal processing, and is particularly suitable for adjusting the brightness of a video input signal in a video camera or video hard copy printer.

2. Description of the Prior Art

With recent advances in hard copy printing technologies, and particularly hard copy color printing technologies, it has become possible in the last few years to produce hard copy printouts of video and computer images with high-fidelity reproduction of source image colors using subliminal heat transfer printing and other printing technologies. By using new recording materials and image processing techniques, including high definition television technologies, the resolution and color reproducibility of these hard copy printouts now approach that of conventional silver halide photographic media.

Even the best printers, however, have a limited dynamic color range that compares unfavorably with the dynamic range of a CRT by a factor of ten or more. It is therefore possible to obtain color printouts with color characteristics comparable to those of the CRT only when the dynamic range of the video input signal does not exceed the dynamic range of the printer, and the dynamic range is used to the maximum. These limitations have led to the development of specific automatic gain control and black level correction methods (Japanese Laid-Open Patent Publication No. S62-209671) to improve print quality.

When adjusting image brightness in a television receiver, a luminance signal offset value is normally provided to control the image brightness by shifting the luminance signal level. This method is effective when used with a CRT or other display device having a wide dynamic range, but is not as effective when applied in a printer. This is because the dynamic range of the image normally exceeds the dynamic range of the printer. Any shift in the brightness level is thus limited by the maximum ink density (when adjusting for a darker image) and the maximum brightness of the print medium (when adjusting for a lighter image). Brightness adjustment therefore causes a loss of image information, and results in reduced image quality.

A different method, which changes the gradation characteristics of the image without changing the dynamic range of the image, is therefore used. Specifically, the gradation characteristics are adjusted by controlling the brightness histogram of the image and achieve an effective visual change in image brightness.

Figure 11A:
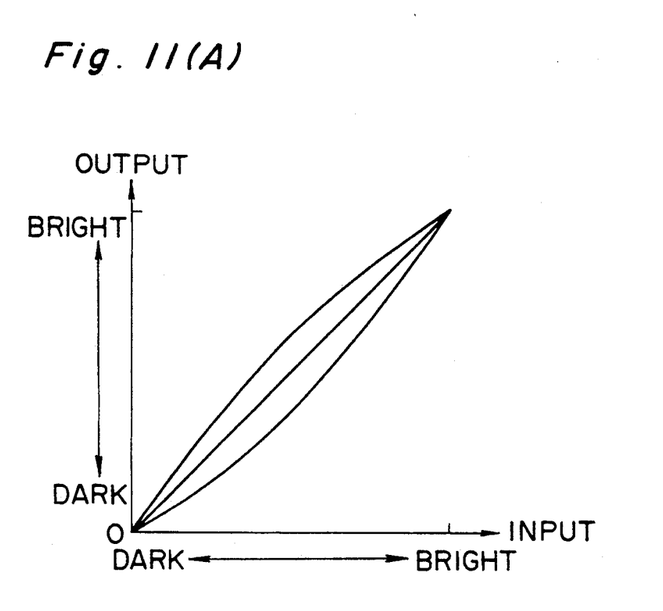
FIGS. 11(A) and 11(B) are each a graph used to describe the gradation conversion characteristics.

As shown in FIG. 11(A), this is achieved by changing the gradation characteristics using gamma conversion of the RGB or luminance signals. To make the image appear brighter, the brightest and darkest parts of the image are left unchanged while the intermediate levels are adjusted along a smooth curve with enhanced brightness. The histogram of image brightness is thus shifted to an increased brightness level without changing the dynamic range of the image, and the image appears "brighter" to the viewer.

Another application of this technology is backlighting compensation in a video camera.

Figure 11B:
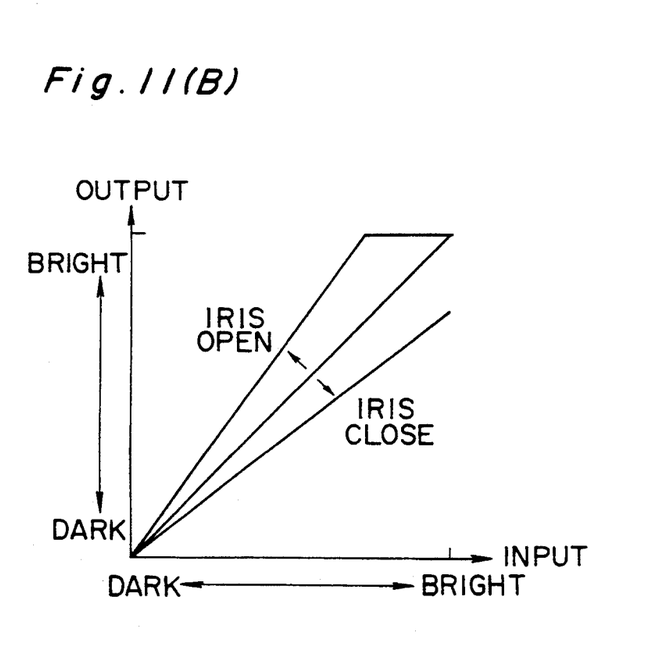

When a subject is recorded against a bright background by a video camera, the lens iris is opened more than usual to increase amount of light from the subject. As shown in FIG. 11 (B), this results in a saturated, white background with no brightness gradations (tones). Gamma conversion is also an effective means for achieving brighter intermediate tones by changing the gradation characteristics when recording under strong backlighting conditions.

These conventional gradation correction methods function effectively with monochrome (gray scale) images, but the hue and chromaticity (saturation) are also changed when these methods are used to adjust the brightness in color images.

Figure 12A:
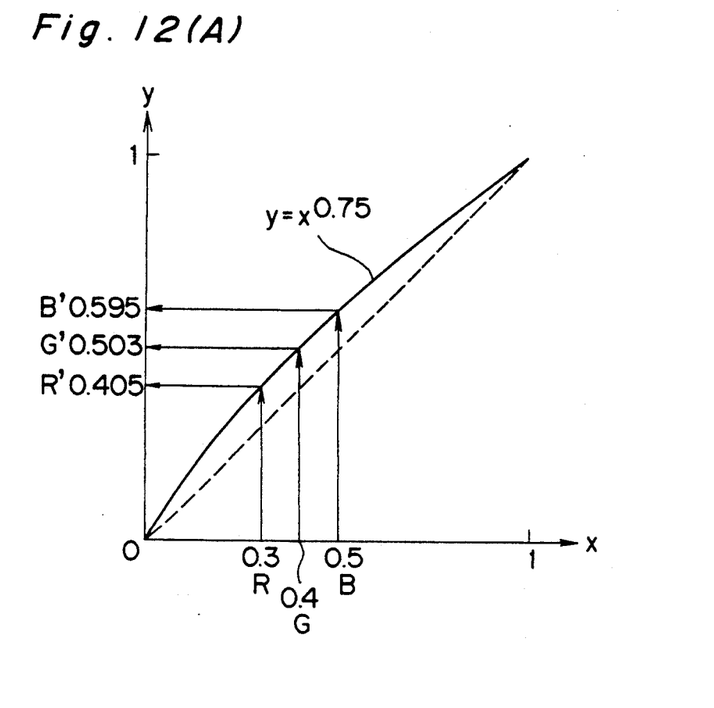
FIGS. 12(A) and 12(B) are each a graph of the gradation correction characteristics of a conventional method applied to RGB signals.
Figure 12B:
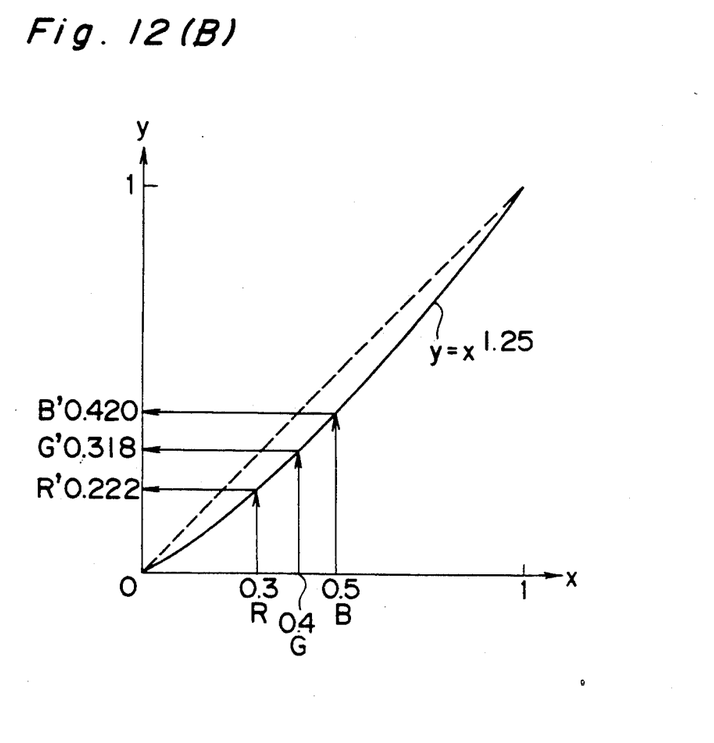

FIG. 12 is a graph of the output signals obtained when conventional gamma conversion gradation correction is applied to the RGB signals. In this example the RGB signal values of the input signal are, respectively, 0.3, 0.4, and 0.5. In FIG. 12 (A) the image is made brighter. Each of the RGB gradations is converted, the values are greater than those of the input signal, and the image appears brighter. However, the R:G:B ratio of the output signal is different from that of the input signal. The hue and saturation are therefore changed, and the colors are not high-fidelity reproductions of the input image colors. There is a particular drop in saturation because the ratio is now closer to 1:1:1.

A similar result is obtained when the gradation is changed to reduce the RGB signal values for a darker image as shown in FIG. 12 (B). The R:G:B ratio of the input and output signals is again different with the increased ratio resulting in a pronounced, unnatural increase in saturation.

As described above, the problem with this conventional method of adjusting color image brightness by changing the gradation characteristics and brightness histogram of the image is that the hue and saturation of the image are also changed.

Figure 13:
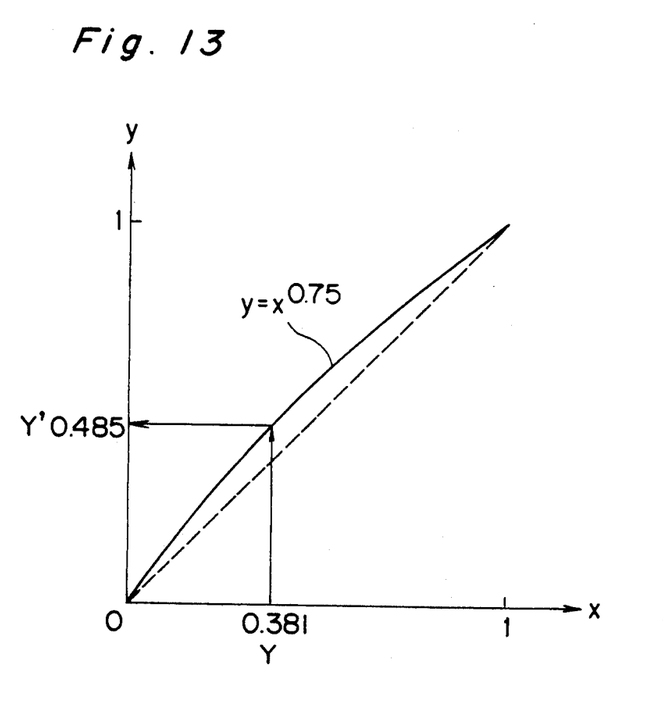
FIG. 13 is a graph of the gradation correction characteristics of a conventional method applied to the luminance signal component of an image signal.

FIG. 13 is a graph of gradation correction applied to the luminance signal to brighten the image when the video signal comprises a luminance signal and color difference signals input.

As in the above example, the input signal values are R=0.3, G=0.4, and B=0.5. In the NTSC format, the luminance signal is thus Y=0.3R+0.59G+0.11B=0.381, and the color difference signals are R−Y=−0.081 and B−Y=0.119.

The brightness of intermediate tones is, of course, changed because the gradation characteristics of the luminance signal are changed with this method, but the hue and saturation are also changed in the same way as the gradation characteristics of the separate RGB signals are changed. To obtain a brighter corrected image, the value of the converted luminance signal is greater than that of the input signal, and the amplitude of the color difference signal is left unchanged. Therefore, the reconverted RGB signal component values are R=0.404, G=0.504, and B=0.604, the R:G:B signal ratio is different from that of the source image and approaches 1:1:1, and the hue again changes and the saturation drops.

Another method makes it possible to keep the color signal ratio constant, but when gradation correction is applied to a pixel with a high luminance signal value and the R:G:B ratio is kept constant, the image reproduction range (e.g., R, G, B≦1) is exceeded, and the hue and saturation of the reproduced image again become unnatural.

U.S. patent application Ser. No. 07/772,559 of Haruo YAMASHITA et al. filed Oct. 7, 1991, entitled "Gradation Correction Method and Device" and assigned to the same assignee as the present application relates to the present invention.

As described above, the problem with each of the above methods, i.e., gradation correction of the separate R, G, B signals, gradation conversion of the luminance signal, and color signal conversion of high luminance pixels while maintaining a constant color signal ratio, is that it is not possible to only adjust the brightness without also changing image colors.

SUMMARY OF THE INVENTION

Therefore, an object of the present invention is provide a gradation correction method and apparatus for effective brightness adjustment within the dynamic range of the image without changing the hue or saturation characteristics of the image.

To achieve this object, a gradation correction apparatus according to a first embodiment comprises: a luminance signal conversion means for obtaining the original luminance signal, which is before gamma conversion, from the input signals; a luminance gamma conversion means for gamma converting said original luminance signal to the desired gradation characteristics to obtaining a gamma converted luminance signal; a correction coefficient calculation means for obtaining a ratio of the gamma converted luminance signal to the original luminance signal; a first RGB operation means for multiplying said ratio by each of the R, G, and B input signals for obtaining primary gradation-corrected R, G, and B signals; a color difference signal operation means for producing a difference between each of the R, G, and B input signals and the original luminance signal; a second RGB operation means for adding the gamma converted luminance signal to each of said difference for obtaining secondary gradation-corrected R, G, and B signals; and an RGB determination means for obtaining final gradation-corrected R, G, B signals based on said primary and secondary gradation-corrected R, G, and B signals.

A gradation correction apparatus according to a second embodiment comprises: a luminance signal conversion means for obtaining the original luminance signal, which is before gamma conversion, from the input signals; a luminance gamma conversion means for gamma converting said original luminance signal to the desired gradation characteristics to obtaining a gamma converted luminance signal; a correction coefficient calculation means for obtaining a ratio of the gamma converted luminance signal to the original luminance signal; a means for producing first and second original color difference signals; a color difference conversion means for multiplying each of said first and second color difference signals said ratio for obtaining first and second primary gradation-corrected color difference signals; a color difference determination means for obtaining first and second final gradation-corrected color difference signals based on said first and second primary gradation-corrected color difference signals and said first and second original color difference signals.

A gradation correction apparatus according to another embodiment comprises: a luminance signal conversion means for obtaining the original luminance signal, which is before gamma conversion, from the input signals; a luminance gamma conversion means for gamma converting said original luminance signal to the desired gradation characteristics to obtaining a gamma converted luminance signal; a correction coefficient calculation means for obtaining a ratio of the gamma converted luminance signal to the original luminance signal; a means for producing a two-phase modulated original chroma signal; a chrominance conversion means for multiplying said original chroma signal with said ratio for obtaining primary gradation-corrected chroma signals; a chrominance determination means for obtaining final gradation-corrected chroma signal based on said primary gradation-corrected chroma signal and said original chroma signal.

Operation of the First Embodiment

A gradation correction apparatus according to the first embodiment of the invention obtains the luminance signal of the RGB input signals before gamma conversion by means of the luminance signal conversion means, applies gradation conversion of the specific desired characteristics to the obtained luminance signal, and obtains the luminance signal after gamma conversion by means of the luminance gamma conversion mans. The correction coefficient calculation means obtains the ratio (correction coefficient) of the luminance signal after gamma conversion to the luminance signal before gamma conversion. The first RGB operation means then multiplies this correction coefficient by each of the RGB input signals to obtain the first gradation-corrected RGB signals.

The color difference signal operation means obtains the pre-gamma conversion color difference from the RGB input signals and the luminance signal before gamma conversion, and the second RGB operation means adds the pre-gamma conversion color difference to the luminance signal after gamma conversion to obtain the second gradation-corrected RGB signals.

The RGB determination means obtains and outputs the final gradation-corrected RGB signals based on the obtained first and second gradation-corrected RGB signals. As a result, the gradation correction apparatus can apply gradation conversion to the RGB input signals to obtain the desired gradation characteristics in the luminance component with minimal change in the hue and saturation characteristics of the image signal.

Operation of the Second Embodiment

A gradation correction apparatus according to the second embodiment of the invention applies gradation conversion of the specific desired characteristics to the luminance signal component of the video input signal by means of the luminance gamma conversion means, and obtains the luminance signal after gamma conversion as the output luminance signal. The video input signal in this embodiment comprises the luminance signal and two color difference signals or a chroma input signal.

The correction coefficient calculation means obtains the ratio (correction coefficient) of the luminance signal after gamma conversion to the luminance signal before gamma conversion. The color difference conversion means then multiplies this correction coefficient by each of the two color difference or chroma input signals to obtain the color difference conversion signals.

The color difference determination means then obtains the output color difference or chroma signal based on the color difference conversion signals and the color difference or chroma input signals. As a result, the gradation correction apparatus can apply gradation conversion to the luminance and two color difference or chroma input signals to obtain the desired gradation characteristics in the luminance component with minimal change in the hue and saturation characteristics of the image signal.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
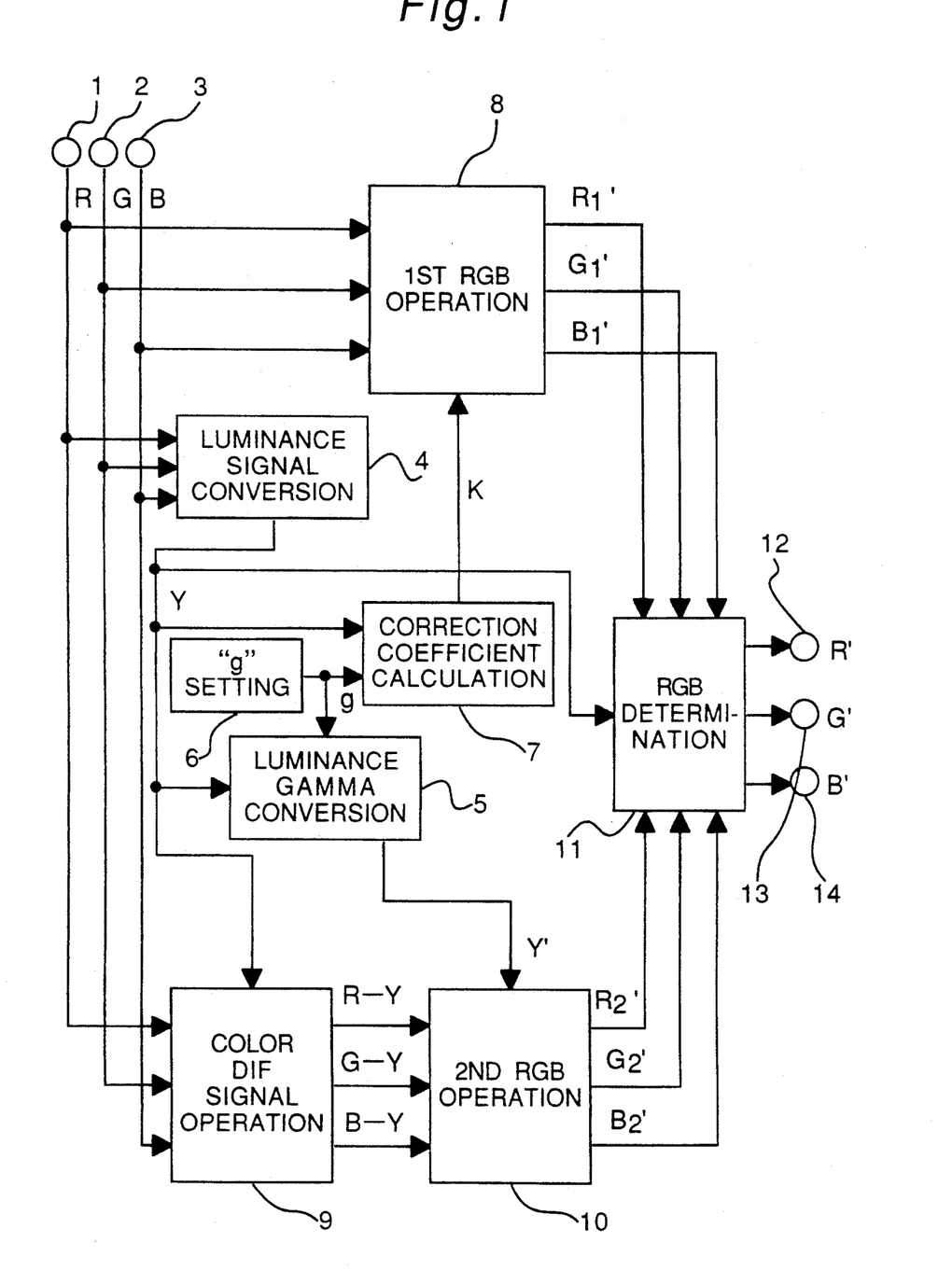
FIG. 1 is a block diagram of a gradation correction apparatus according to the first embodiment of the invention.

The preferred embodiments of a gradation correction method and apparatus according to the present invention are described below with reference to the accompanying figures, of which FIG. 1 is a block diagram of a gradation correction apparatus according to the first embodiment of the invention. This first embodiment is a gradation correction apparatus which outputs gradation-corrected RGB signals for a video signal input as RGB signals.

Referring to FIG. 1, the RGB input signals are input from the R, G, and B input terminals 1, 2, and 3, respectively, to the luminance signal conversion means 4, first RGB operation means 8, and the color difference signal operation means 9.

The luminance signal conversion means 4 receives the RGB input signals and produces the luminance signal Y before gamma conversion. The luminance gamma conversion means 5 applies the desired gradation conversion to the luminance signal Y, and outputs the luminance signal Y' after gamma conversion. The setting means 6 is used to set the desired gradation conversion which is applied to the luminance gamma conversion means 5. The correction coefficient calculation means 7 calculates a ratio (correction coefficient K) of the luminance signal Y' after gamma conversion to the luminance signal Y before gamma conversion.

The first RGB operation means 8 multiplies the correction coefficient K by each of the RGB input signals to obtain the first gradation-corrected RGB signals ($R_1'$, $G_1'$, $B_1'$).

The color difference signal operation means 9 obtains the color difference signals (R−Y), (G−Y), and (B−Y) from the RGB input signals and the luminance signal Y before gamma conversion.

The second RGB operation means 10 adds the luminance signal Y' after gamma conversion to each of the three color difference signals (R−Y), (G−Y), and (B−Y) output by the color difference signal operation means 9 to obtain the second gradation-corrected RGB signals ($R_2'$, $G_2'$, $B_2'$).

The RGB determination means 11 calculates the final RGB output signals (R', G', B') from the first gradation-corrected RGB signals ($R_1'$, $G_1'$, $B_1'$) output by the first RGB operation means 8 and the second gradation-corrected RGB signals ($R_2'$, $G_2'$, $B_2'$) output by the second RGB operation means 10, and outputs the final RGB output signals (R', G', B') from the R', G', and B' output terminals 12, 13, and 14, respectively.

The luminance signal conversion means 4 functions to calculate the luminance signal Y from the RGB signals according to the sensitivity characteristics of the human eye. The conversion characteristics may vary with the hue of the primary colors red, green, and blue, but are defined in the first embodiment by equation (1) below.

$$Y = 0.3R + 0.59G + 0.11B \tag{1}$$

The luminance signal Y' after gamma conversion is produced from the luminance gamma conversion means 5 which applies the desired gradation conversion to the luminance signal Y defined by equation (1). If the gamma conversion characteristic that changes the gradation characteristics of the luminance signal is defined as a function f, the luminance signal Y' after gamma conversion can be expressed by equation (2).

$$Y' = f(Y) \tag{2}$$

Normally this function f is defined to change the curve of the intermediate tones without changing the maximum and minimum luminance values (i.e., black and the brightest luminance levels), resulting in a curve similar to those shown in FIG. 11(A). The function f is therefore defined by equation (3) below in the present embodiment.

$$f(Y) = Y^g \tag{3}$$

where g is the gamma conversion coefficient supplied to the luminance gamma conversion means 5 by the setting means 6.

Figure 2:
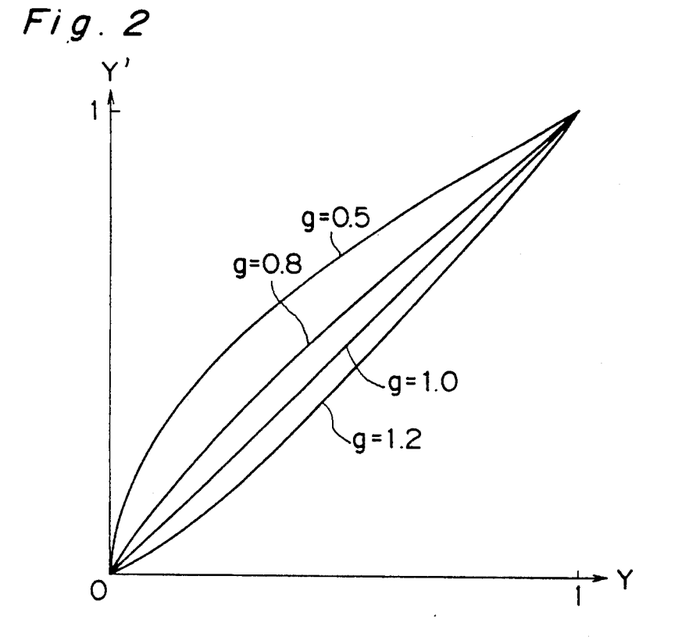
FIG. 2 is a graph of the gamma conversion means characteristics.

FIG. 2 is a graph of the gamma conversion characteristics used to change the luminance of intermediate tones based on equation (3). When the overall image brightness is to be increased, the setting means 6 supplies a gamma conversion coefficient g less than one ($g < 1$); a gamma conversion coefficient g greater than one ($g > 1$) is used to decrease image brightness. The image brightness is not changed when the setting means 6 outputs a gamma conversion coefficient g of one ($g = 1$) to the luminance gamma conversion means 5.

The correction coefficient calculation means 7 then obtains the ratio (correction coefficient K) of the luminance signal Y' after gamma conversion to the luminance signal Y before gamma conversion. The correction coefficient K can be obtained from the luminance signal Y before gamma conversion by applying equation (4) because Y' is a function of Y as shown in equations (2) and (3) above.

$$\begin{aligned} K &= Y'/Y \\ &= f(Y)/Y \\ &= Y^g/Y \\ &= Y^{g-1} \end{aligned} \quad (4)$$

Figure 3:
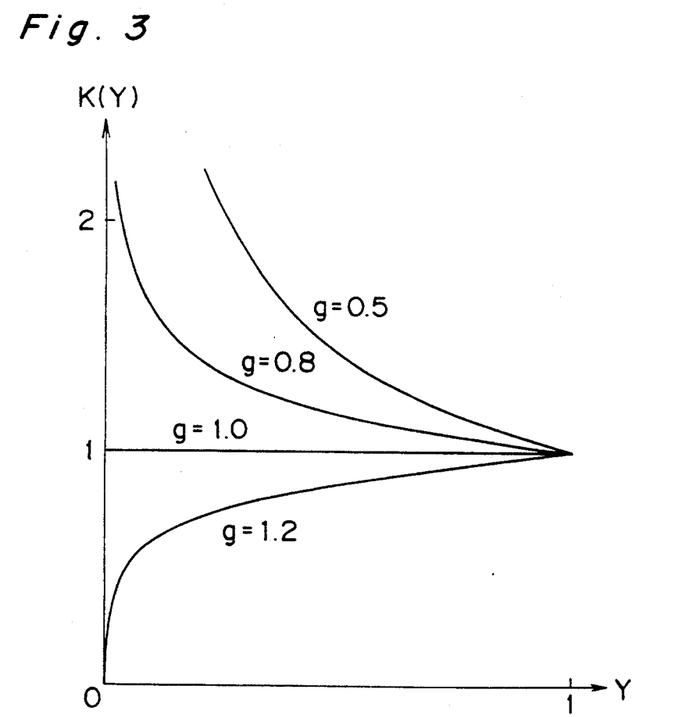
FIG. 3 is a graph of the correction coefficient operation means characteristics.

The relationship between the luminance signal Y and the correction coefficient K output by the correction coefficient calculation means 7 is shown in FIG. 3.

Figure 4:
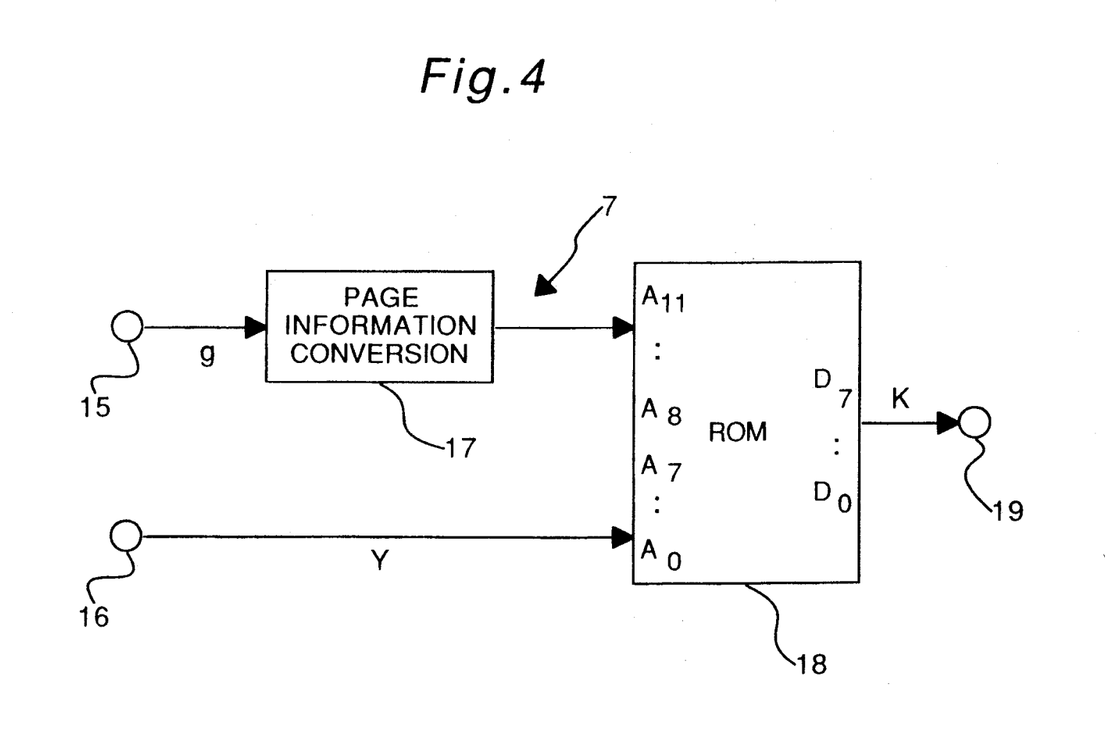
FIG. 4 is a diagram of the structure of the correction coefficient operation means.
Figure 5:
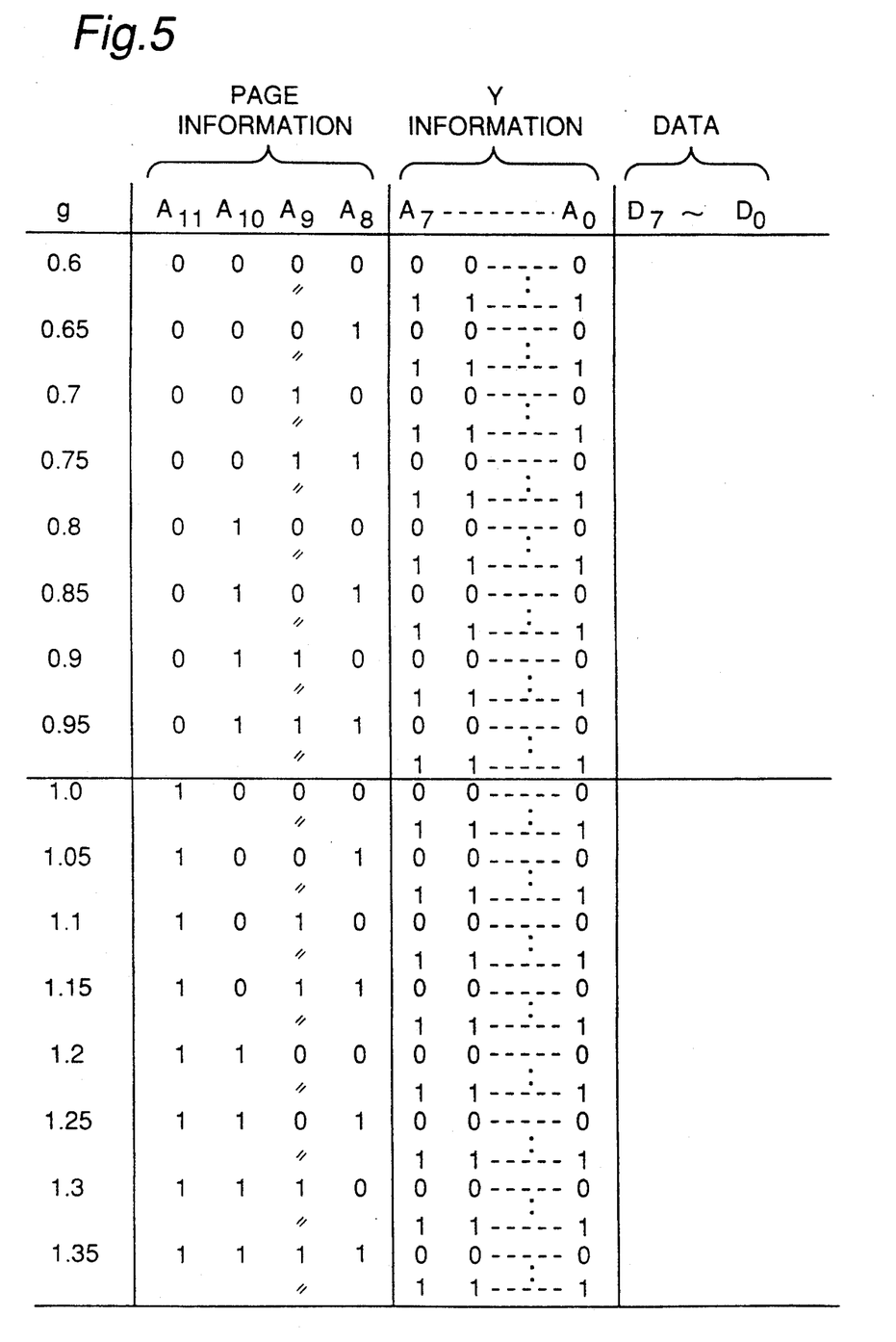
FIG. 5 is a table of the page information conversion means characteristics.

As shown in FIG. 4, the correction coefficient calculation means 7 comprises a gamma conversion coefficient input terminal 15, luminance input terminal 16, page information conversion unit 17, a ROM 18 having 12-bit address input and 8-bit data output, and a correction coefficient output terminal 19. The lower 8-bit inputs ($A_0$–$A_7$) are used for the luminance information Y, and upper 4-bit inputs ($A_8$–$A_{11}$) are used for the page information. Therefore, ROM 18 has $2^4 = 16$ pages with each page representing each value of g, as shown in FIG. 5, and each page has $2^8 = 256$ data determined by the luminance information Y.

The gradation conversion characteristics are selected by converting the gamma conversion coefficient g output from the setting means 6 to 4-bit page information by the page information conversion unit 17, and applying this to the upper address of the ROM to change the table. The relationship between the values of the gamma conversion coefficient g and the page information is shown in the table in FIG. 5.

Figure 6:
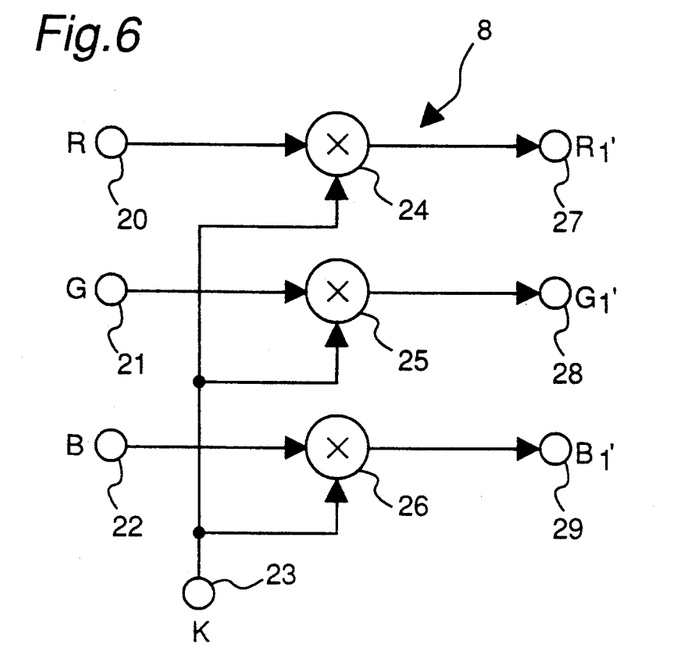
FIG. 6 is a diagram of the structure of the first RGB operation means in the first embodiment of the invention.

The structure of the first RGB operation means 8 is shown in FIG. 6. As shown, the first RGB operation means 8 comprises R, G, and B input terminals 20, 21, and 22, respectively, a correction coefficient K input terminal 23, multipliers 24, 25, and 26, and $R_1'$, $G_1'$, and $B_1'$ output terminals 27, 28, and 29, respectively. The first RGB operation means 8 functions to multiply each of the RGB input signals by the correction coefficient K from the correction coefficient calculation means 7 to calculate the first gradation-corrected RGB signals ($R_1'$, $G_1'$, and $B_1'$) as defined by equations (5), (6), and (7).

$$R_1' = KR \quad (5)$$

$$G_1' = KG \quad (6)$$

$$B_1' = KB \quad (7)$$

The luminance of the first gradation-corrected RGB signals is Y', and the relationship shown in equation (8) can be calculated from the relationship shown in equation (4).

$$Y' = KY \quad (8)$$

Thus, equation (9) can be obtained from equations (5) through (8).

$$\frac{R_1' - Y'}{Y'} = \frac{R - Y}{Y}$$

$$\frac{G_1' - Y'}{Y'} = \frac{G - Y}{Y} \quad (9)$$

$$\frac{B_1' - Y'}{Y'} = \frac{B - Y}{Y}$$

As shown by these equations, the luminance of the first gradation-corrected RGB signals ($R_1'$, $G_1'$, and $B_1'$) is K-times greater than the luminance of the RGB signals (R, G, B) before correction, and the ratio between the luminance and color difference values is unchanged.

The color difference signal operation means 9 calculates the difference between the RGB input signals and the luminance signal before gamma conversion, i.e., the values (R−Y), (G−Y), and (B−Y).

Figure 7:
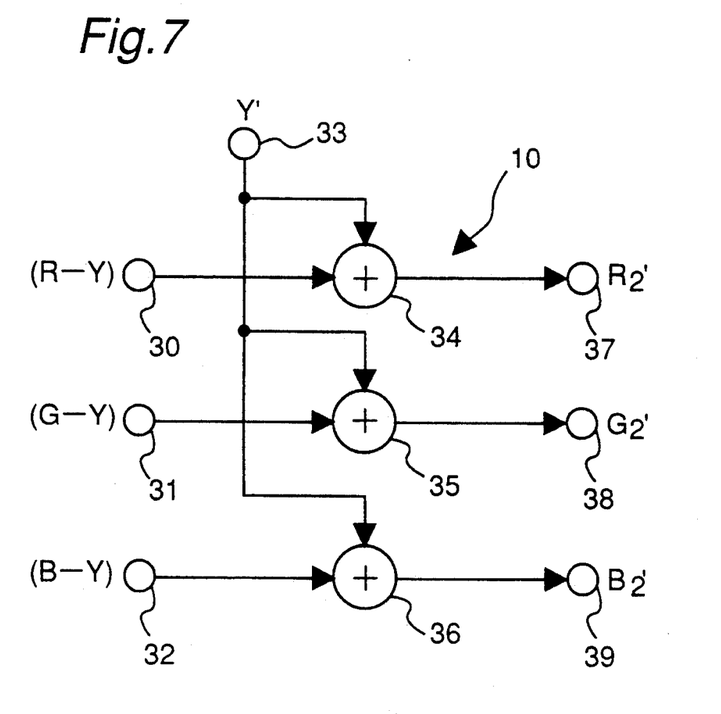
FIG. 7 is a diagram of the structure of the second RGB operation means in the first embodiment of the invention.

As shown in FIG. 7, the second RGB operation means 10 comprises the color difference signal input terminals 30, 31 and 32 for (R−Y), (G−Y) and (B−Y) signals, respectively, a Y' input terminal 33 through which the luminance signal Y' after gamma conversion is input, adders 34, 35, and 36, and terminals 37, 38, and 39 for producing the second gradation-corrected RGB signals $R_2'$, $G_2'$, and $B_2'$, respectively. The second gradation-corrected RGB signals $R_2'$, $G_2'$, and $B_2'$ are obtained by adding the luminance signal Y' after gamma conversion to the input color difference signals (R−Y), (G−Y), and (B−Y) as shown in equation (10) below.

$$R_2' = R - Y + Y'$$

$$G_2' = G - Y + Y'$$

$$B_2' = B - Y + Y' \quad (10)$$

The relationship between the color difference values after gradation correction can be obtained from equation (10) and expressed as equation (11).

$$R_2' - Y' = R - Y$$

$$G_2' - Y' = G - Y$$

$$B_2' - Y' = B - Y \quad (11)$$

As shown by these equations, the luminance of the second gradation-corrected RGB signals is K-times greater than the luminance of the source RGB signals (R, G, B) before correction, but the color difference values are unchanged.

Figure 8:
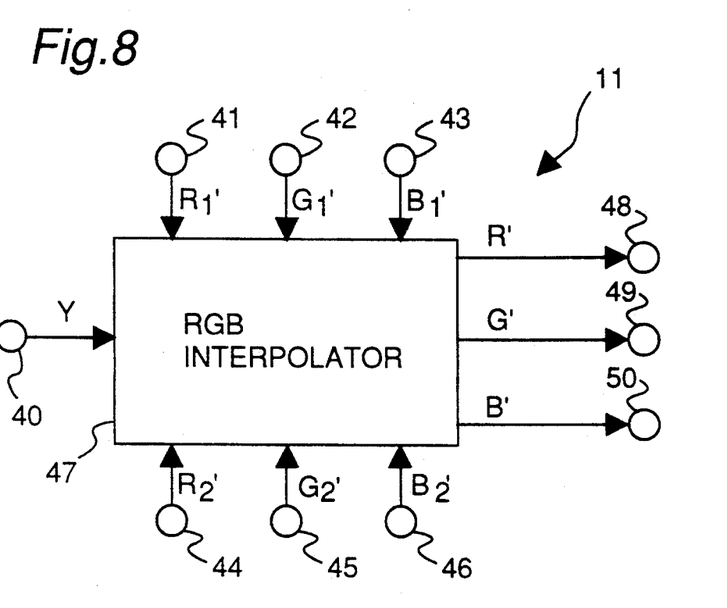
FIG. 8 is a diagram of the structure of the RGB determination means in the first embodiment of the invention.

The structure of the RGB determination means 11 is shown in FIG. 8. The RGB determination means 11 comprises input terminals 40 for the luminance signal Y, input terminals 41, 42 and 43 for first gradation-corrected RGB signals $R_1'$, $G_1'$, and $B_1'$, respectively, and input terminals 44, 45, and 46 for second gradation-corrected RGB signals $R_2'$, $G_2'$, and $B_2'$, respectively, and RGB interpolator 47, and output terminals 48, 49, and 50 for the R', G', and B' signals, respectively.

The RGB interpolator 47 calculates and outputs the RGB signals (R', G', and B') after gradation correction by interpolating the first gradation-corrected RGB signals $R_1'$, $G_1'$, and $B_1'$ from terminals 41, 42, and 43, and the second gradation-corrected RGB signals $R_2'$, $G_2'$, and $B_2'$ from terminals 44, 45, and 46, respectively, depending on the value of the luminance signal before gamma conversion. More specifically, the RGB signals ($R'$, $G'$, $B'$) after gradation correction are obtained by the interpolation by the ratio $p:(1-p)$ between the first and second gradation-corrected RGB signals ($R_1'$, $G_1'$, $B_1'$) and ($R_2'$, $G_2'$, $B_2'$), respectively, as defined by equation (12).

$$R' = pR_1' + (1-p)R_2'$$
$$G' = pG_1' + (1-p)G_2'$$
$$B' = pB_1' + (1-p)B_2' \quad (12)$$

wherein p is an interpolation ratio and is $0 \leq p \leq 1$.

The interpolation ratio p used in equation (12) is set, for example, according to equation (13).

If $0 \leq Y < \alpha_1$, then $p=0$

If $\alpha_1 \leq Y < \alpha_2$, then $p=(Y-\alpha_1)/(\alpha_2-\alpha_1)$

If $\alpha_2 \leq Y < \beta_1$, then $p=1$

If $\beta_1 \leq Y < \beta_2$, then $p=(Y-\beta_2)/(\beta_1-\beta_2)$

If $\beta_2 \leq Y \leq 1$, then $p=0$ \quad (13)

Figure 9:
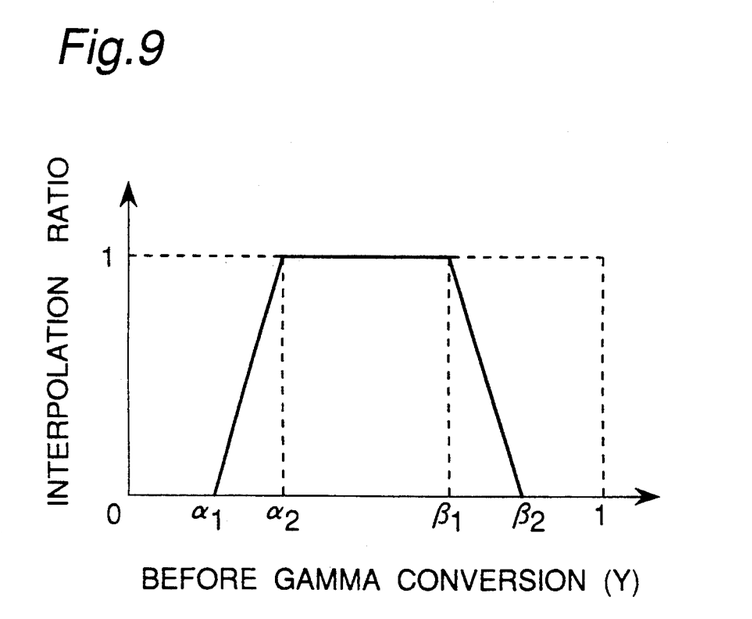
FIG. 9 is a graph of the interpolation ratio characteristics.

FIG. 9 is a graph of the interpolation ratio p set by equation (13). The input pixels are classified depending on the luminance signal Y before gamma conversion as intermediate luminance pixels ($\alpha_2 \leq Y < \beta_1$), extremely low luminance pixels ($0 \leq Y < \alpha_1$), extremely high luminance pixels ($\beta_2 \leq Y \leq 1$), slightly low luminance pixels ($\alpha_1 \leq Y < \alpha_2$), and slightly high luminance pixels ($\beta_1 \leq Y < \beta_2$). The first gradation-corrected RGB signals ($R_1'$, $G_1'$, $B_1'$) are output for the intermediate luminance pixels, the second gradation-corrected RGB signals ($R_2'$, $G_2'$, $B_2'$) are output for the extremely low and extremely high luminance pixels, and the gradation-corrected RGB signals ($R'$, $G$, $B'$) calculated by interpolation between the first and second gradation-corrected RGB signals are output for the slightly low and slightly high luminance pixels. In equation (13), the internal ratio p is set depending on luminance signal Y, but the same can be set depending on Y'.

Why the gradation correction apparatus according to the present invention can apply gradation correction of the luminance component according to the desired gradation characteristics with little or no change in the hue and saturation characteristics of the image is described below.

The luminance of both the first gradation-corrected RGB signals ($R_1'$, $G_1'$, $B_1'$) and the second gradation-corrected RGB signals ($R_2'$, $G_2'$, $B_2'$) is Y', which is the luminance of the signal obtained by applying gamma conversion to the luminance input signal Y to obtain the desired gradation characteristics.

The following relationship (equation (14)) between the first gradation-corrected RGB signals ($R_1'$, $G_1'$, $B_1'$) and the second gradation-corrected RGB signals ($R_2'$, $G_2'$, $B_2'$) can be derived from equations (9), (4), and (11).

$$\begin{aligned} R_1' - Y' &= (Y'/Y)(R-Y) \\ &= K(R-Y) \\ &= K(R_2'-Y') \end{aligned}$$

$$G_1' - Y' = K(G_2' - Y')$$

$$B_1' - Y' = K(B_2' - Y') \quad (14)$$

Because the characteristics of the correction coefficient K are as shown in FIG. 3, the relationship between the magnitude of the color difference in ($R_1'$, $G_1'$, $B_1'$) and ($R_2'$, $G_2'$, $B_2'$) can be expressed by equation (15).

If $g < 1$, then $(R_1' - Y') > (R_2' - Y')$, $(G_1' - Y') > (G_2' - Y')$, $(B_1' - Y') > (B_2' - Y')$.

If $g > 1$, then $(R_1' - Y') < (R_2' - Y')$, $(G_1' - Y') < (G_2' - Y')$, $(B_1' - Y') < (B_2' - Y')$. \quad (15)

In addition, the relationship between the magnitude of the luminance signal Y before gamma conversion and the luminance signal Y' after gamma conversion can be expressed by equation (16) based on FIG. 2.

If $g < 1$, then $Y' > Y$.

If $g > 1$, then $Y' < Y$. \quad (16)

From equations (15) and (16), the relationship between the magnitude of the color difference in ($R_1'$, $G_1'$, $B_1'$) and ($R_2'$, $G_2'$, $B_2'$) can be expressed by equation (17).

If $Y' > Y$, then $(R_1' - Y') > (R_2' - Y')$, $(G_1' - Y') > (G_2' - Y')$, $(B_1' - Y') > (B_2' - Y')$.

If $Y' < Y$, then $$(R_1'-Y') < (R_2'-Y'), (G_1'-Y') < (G_2'-Y'),$$
$$(B_1'-Y') < (B_2'-Y'). \quad (17)$$

In other words, when gradation correction is applied to increase the luminance, the color difference of the first gradation-corrected RGB signals ($R_1'$, $G_1'$, $B_1'$) is greater, and when gradation correction is applied to decrease the luminance, the color difference of the second gradation-corrected RGB signals ($R_2'$, $G_2'$, $B_2'$) is greater.

When the image is corrected to be brighter (FIG. 12(A)) using a conventional gradation correction apparatus, saturation drops because the color difference in the resulting signal is small. With the gradation correction apparatus according to the present invention, however, the first gradation-corrected RGB signals are output for intermediate luminance pixels, thus preventing saturation loss by maintaining the color difference ratio. In addition, when the image is corrected to be darker (FIG. 12(B)) using a conventional gradation correction apparatus, the color difference is increased, resulting in an unnaturally high saturation level. This is also prevented by the gradation correction apparatus of the present invention, because the first gradation-corrected RGB signals are output for intermediate luminance pixels and the color difference ratio is maintained.

As shown by equation (17), the color difference increases when the image is corrected to a higher luminance level with the first gradation-corrected RGB signals ($R_1'$, $G_1'$, $B_1'$). As a result, when the luminance level of high luminance pixels is increased, the luminance level of the RGB output signal exceeds one, the signal cannot be reproduced, and the hue value changes. To prevent this, the second gradation-corrected RGB signals ($R_2'$, $G_2'$, $B_2'$) are output for pixels with an extremely low or extremely high luminance level. Because the second gradation-corrected RGB signals ($R_2'$, $G_2'$, $B_2'$) result in a smaller color difference than the first ($R_1'$, $G_1'$, $B_1'$), the RGB output signal can be held within the range of reproducible values ($0 \leq R, G, B \leq 1$), and a change in hue can be prevented.

In addition, because the RGB output signal for pixels with a slightly low or slightly high luminance level is obtained by interpolation based on the first gradation-corrected RGB signals ($R_1'$, $G_1'$, $B_1'$) and the second gradation-corrected RGB signals ($R_2'$, $G_2'$, $B_2'$), false contours caused by sudden changes in the color difference can be prevented in pixels for a gradual change in luminance.

Figure 10A:
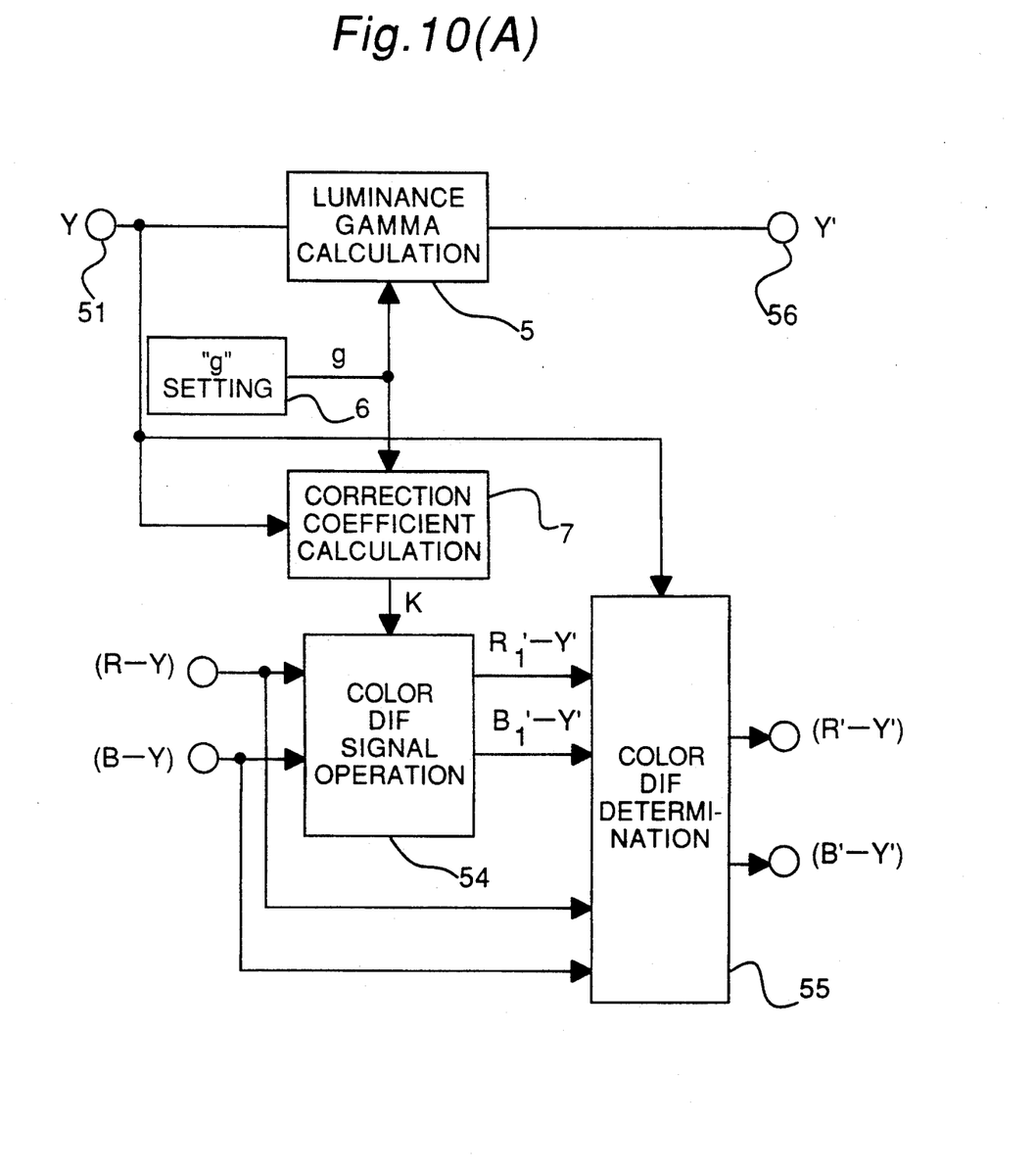
FIGS. 10(A) and 10(B) are each a block diagram of a gradation correction apparatus according to the second embodiment of the invention.

FIG. 10(A) is a block diagram of a gradation correction apparatus according to a second embodiment of the invention. This gradation correction apparatus outputs the gradation-corrected luminance signal Y' and two color difference output signals ($R'-Y'$) and ($B'-Y'$) for a video input signal comprising a luminance input signal Y and two color difference input signals ($R-Y$) and ($B-Y$). As shown in FIG. 10(A), this gradation correction apparatus comprises a luminance signal Y input terminal 51, ($R-Y$) color difference signal input terminal 52, ($B-Y$) color difference signal input terminal 53, a color difference conversion means 54, color difference determination means 55, and the output luminance signal Y' terminal 56 and output color difference signal terminals ($R'-Y'$) and ($B'-Y'$) 57, and 58, respectively.

The luminance gamma conversion means 5, setting means 6, and correction coefficient calculation means 7 in this second embodiment are the same as those of like reference numbers in the first embodiment described above. The luminance gamma conversion means 5 applies the desired gradation correction set by the setting means 6 to the input luminance signal Y, and the correction coefficient calculation means 7 obtains and outputs the ratio (correction coefficient K) of the corrected luminance signal Y' to the input luminance signal Y by means of the structure shown in FIG. 4.

The color difference conversion means 54 multiplies the correction coefficient K by each of the two color difference input signals ($R-Y$) and ($B-Y$) to obtain the first gradation-corrected color difference signals ($R_1'-Y'$) and ($B_1'-Y'$) as defined by equation (18).

$$R_1' - Y' = K(R-Y)$$
$$B_1' - Y' = K(B-Y) \quad (18)$$

Because the luminance signal Y' after gradation correction can be expressed as a function of the input luminance signal Y as shown in equation (8), substituting these values in equation (18) results in equation (19). As a result, there is no change in the color signal ratio before and after gradation correction in the first gradation-corrected color difference signals.

$$R_1' = KR$$
$$B_1' = KB \quad (19)$$

The color difference determination means 55 determines the color difference output signals ($R'-Y'$) and ($B'-Y'$) depending on the input luminance signal Y as shown in equation (20) from the first gradation-corrected color difference signals ($R_1'-Y'$) and ($B_1'Y'$) and the input color difference signals ($R-Y$) and ($B-Y$).

$$R' - Y' = p(R_1' - Y_1') + (1-p)(R-Y)$$
$$B' - Y' = p(B_1' - Y_1') + (1-p)B'(B-Y) \quad (20)$$

The interpolation ratio p used in equation (20) is set according to equation (13).

Similarly to the gradation correction apparatus according to the first embodiment of the invention described above, a gradation correction apparatus according to the second embodiment can also prevent saturation loss when the luminance level is increased and oversaturation when the luminance level is decreased by outputting the first gradation-corrected color difference signals ($R_1'-Y'$) and ($B_1'-Y'$) for intermediate luminance level pixels to maintain the same color difference ratio. In addition, the input color difference signals ($R-Y$) and ($B-Y$) are output for pixels with an extremely low or high luminance level to suppress the color difference smaller than ($R_1'-Y'$) and ($B_1'-Y'$) when the image luminance is corrected to be brighter. The color difference output signal is therefore held to within the range of reproducible values ($0 \leq R, G, B \leq 1$), and a change in hue can be prevented.

In addition, because the color difference output signal for pixels with a slightly low or slightly high luminance level is obtained by interpolation based on the input color difference signals ($R-Y$) and ($B-Y$) and the corrected color difference signals ($R_1'-Y'$) and ($B_1'-Y'$), false contours caused by sudden changes in the color difference can be prevented in pixels for a gradual change in luminance.

Figure 10B:
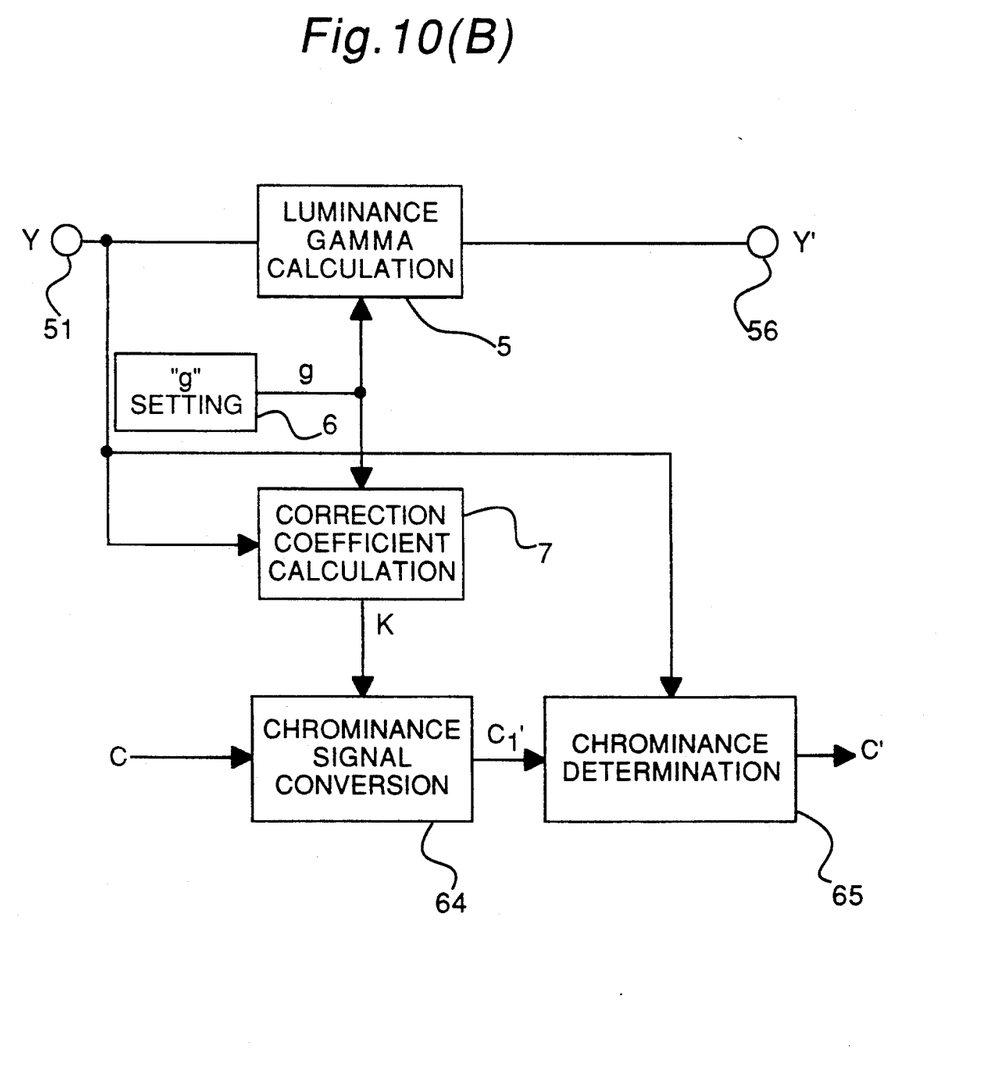

It is to be noted that while the color difference signals (R−Y) and (B−Y) are used in this embodiment described above, the same results are obtained using the amplitude-normalized values $P_B$ and $P_R$ of these signals, and gradation correction can be provided with the same structure using two phase-modulated chroma signals except that processing becomes a single system, as shown in FIG. 10(B). Provided in the circuit of FIG. 10(B) are a device for producing a two-phase modulated original chroma signal C, a chrominance signal conversion means 64 for multiplying the original chroma signal C with the ratio K for obtaining a gradation-corrected chroma signal $C_1'$, a chrominance determination means 65 for obtaining final gradation-corrected chroma signal C' based on the primary gradation-corrected chroma signal $C_1'$ and the chroma signal C.

A function of $Y^8$ is used for gamma conversion in both the first and second embodiments of the invention, but a more open non-linear function can be substituted for this function with no adverse effects. Furthermore, a ROM table is used for the correction coefficient operation means with the table contents selected by the setting means, but RAM and a CPU can also be used to recalculate the table contents during start-up and when updating the table contents. It is also possible to eliminate the tables and calculate in hardware the contents (values) obtained by the equations described in the above embodiments. Finally, it should be noted that a suitable limiting means is required in a practical embodiment of the invention because extremely large values are obtained by the correction coefficient calculation equations shown in the above embodiments when the luminance component approaches zero (0).

As described hereinabove, a gradation correction apparatus according to the first and second embodiments of the invention enables effective brightness adjustment and gradation correction without changing the hue and saturation characteristics of the input image and without exceeding the dynamic range of an RGB input, luminance and color difference signal input, or luminance and chroma signal input device with which the gradation correction apparatus is applied. As a result, the gradation characteristics of the luminance component of the image can be changed and the histogram of the image can be controlled to obtain more desirable brightness characteristics with ease of use comparable to the methods used for monochrome (gray scale) image signals in conventional devices. The invention can therefore be used with immediate and beneficial results adjusting the image brightness in color printers and other devices with a limited (narrow) dynamic range, as well as under extremely wide dynamic range situations created by strong backlighting when recording with a video camera.

The effect of brightness control with the present invention is natural and significant, leading to a wide range of other potential applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gradation correction method comprising the steps of:
   (a) obtaining an original luminance signal, which is before gamma conversion, from R, G, and B input signals;
   (b) gamma converting said original luminance signal according to a predetermined gradation characteristics for obtaining a gamma converted luminance signal;
   (c) multiplying a ratio of the gamma converted luminance signal to the original luminance signal by each of the R, G, and B input signals for obtaining primary gradation-corrected R, G, and B signals;
   (d) adding a difference between each of the R, G, and B input signals and the original luminance signal to the gamma converted luminance signal for obtaining secondary gradation-corrected R, G, and B signals; and
   (e) obtaining a final gradation-corrected R, G, and B signals based on said primary and secondary gradation-corrected R, G, and B signals.

2. A gradation correction method as claimed in claim 1, wherein said step (e) obtains the final gradation-corrected R, G, and B signals by interpolation from the primary and secondary gradation-corrected R, G, and B signals depending on the value of the original luminance signal.

3. A gradation correction apparatus for processing R, G, and B input signals, comprising:
   a luminance signal conversion means for obtaining the original luminance signal, which is before gamma conversion, from the input signals;
   a luminance gamma conversion means for gamma converting said original luminance signal to the desired gradation characteristics to obtain a gamma converted luminance signal;
   a correction coefficient calculation means for obtaining a ratio of the gamma converted luminance signal to the original luminance signal;
   a first RGB operation means for multiplying said ratio by each of the R, G, and B input signals for obtaining primary gradation-corrected R, G, and B signals;
   a color difference signal operation means for producing a difference between each of the R, G, and B input signals and the original luminance signal;
   a second RGB operation means for adding the gamma converted luminance signal to each of said difference for obtaining secondary gradation-corrected R, G, and B signals; and
   an RGB determination means for obtaining final gradation-corrected R, G, B signals based on said primary and secondary gradation-corrected R, G, and B signals.

4. A gradation correction apparatus according to claim 3, wherein said RGB determination means obtains the final gradation-corrected R, G, B signals by interpolation from said primary and secondary gradation-corrected R, G, and B signals depending on the value of the original luminance signal.

5. A gradation correction method comprising the steps of:
   (a) obtaining an original luminance signal and first and second original color difference signals;
   (b) gamma converting said original luminance signal according to a predetermined gradation characteristics for obtaining a gamma converted luminance signal;
   (c) multiplying a ratio of the gamma converted luminance signal to the original luminance signal by each of the first and second original color difference signals for obtaining first and second primary gradation-corrected color difference signals; and (d) obtaining first and second final gradation-corrected color difference signals based on said first and second primary gradation-corrected color difference signals and said first and second original color difference signals.

6. A gradation correction method as claimed in claim 5, wherein said step (d) obtains the final gradation-corrected color difference signal by interpolation from the primary gradation-corrected color difference signals and said original color difference signals depending on the value of the original luminance signal.

7. A gradation correction method comprising the steps of:

(a) obtaining an original luminance signal and two-phase modulated original chroma signal;

(b) gamma converting said original luminance signal according to a predetermined gradation characteristics for obtaining a gamma converted luminance signal;

(c) multiplying a ratio of the gamma converted luminance signal to the original luminance signal by said original chroma signal for obtaining a primary gradation-corrected chroma signal; and (d) obtaining final gradation-corrected chroma signal based on said primary gradation-corrected chroma signal and said original chroma signal.

8. A gradation correction method as claimed in claim 7, wherein said step (d) obtains the final gradation-corrected chroma signal by interpolation from said primary gradation-corrected chroma signal and said original chroma signal depending on the value of the original luminance signal.

9. A gradation correction apparatus for processing an input luminance signal and first and second input color difference signals comprising:

a luminance gamma conversion means for gamma converting said input luminance signal to the desired gradation characteristics to obtain a gamma converted luminance signal;

a correction coefficient calculation means for obtaining a ratio of the gamma converted luminance signal to the input luminance signal;

a color difference conversion means for multiplying each of said first and second color difference signals by said ratio for obtaining first and second primary gradation-corrected color difference signals and a color difference determination means for obtaining first and second final gradation-corrected color difference signals based on said first and second primary gradation-corrected color difference signals and said first and second input color difference signals.

10. A gradation correction apparatus according to claim 9, wherein said color difference determination means obtains the final gradation-corrected color difference signals by interpolation from said first and second primary gradation-corrected color difference signals and said first and second input color difference signals depending on the value of the input luminance signal.

11. A gradation correction apparatus for processing an input luminance signal and an input chroma signal comprising:

a luminance gamma conversion means for gamma converting said input luminance signal to the desired gradation characteristics to obtain a gamma converted luminance signal;

a correction coefficient calculation means for obtaining a ratio of the gamma converted luminance signal to the input luminance signal;

a chrominance conversion means for multiplying said input chroma signal with said ratio for obtaining primary gradation-corrected chroma signals; and a chrominance determination means for obtaining final gradation-corrected chroma signal based on said primary gradation-corrected chroma signal and said input chroma signal.

12. A gradation correction apparatus according to claim 11, wherein said chrominance determination means obtains the final gradation-corrected chroma signal by interpolation from said primary gradation-corrected chroma signal and said input chroma signal depending on the value of the input luminance signal.

* * * * *